United States Patent
Gaglani

[11] Patent Number: 6,127,467
[45] Date of Patent: Oct. 3, 2000

[54] AMINOCARBOXYLATE SALTS AS CORROSION INHIBITORS IN COATING APPLICATIONS

[75] Inventor: Kamlesh D. Gaglani, South Plainfield, N.J.

[73] Assignee: Cosan Chemical Corporation, Carlstadt, N.J.

[21] Appl. No.: 08/037,485

[22] Filed: Mar. 24, 1993

Related U.S. Application Data

[63] Continuation of application No. 07/821,240, Jan. 10, 1992, abandoned, which is a continuation of application No. 07/418,294, Oct. 6, 1989, abandoned.

[51] Int. Cl.$^7$ .............................. C08K 5/57; B32B 15/04
[52] U.S. Cl. ........................ 524/178; 524/204; 428/457
[58] Field of Search ............................ 428/457; 524/178, 524/204

[56] References Cited

U.S. PATENT DOCUMENTS

| | | | |
|---|---|---|---|
| 2,926,108 | 2/1960 | Anderson | 524/204 |
| 3,054,750 | 9/1962 | Jolly . | |
| 3,099,521 | 7/1963 | Arensberg et al. . | |
| 3,384,590 | 5/1968 | Eversole et al. . | |
| 3,418,253 | 12/1968 | Silverstein | 106/14.13 |
| 3,520,820 | 7/1970 | Hwa | 106/14.13 |
| 4,077,941 | 3/1978 | Stephen et al. | 524/204 |
| 4,238,350 | 12/1980 | Larsen et al. | 106/14.13 |
| 4,243,417 | 1/1981 | Grourke et al. | 106/14.13 |
| 4,387,027 | 6/1983 | May et al. . | |
| 4,443,340 | 4/1984 | May et al. . | |
| 4,556,493 | 12/1985 | Cuisia . | |
| 4,661,523 | 4/1987 | Disch et al. . | |

FOREIGN PATENT DOCUMENTS

| | | |
|---|---|---|
| 1916628 | of 0000 | Germany . |
| 227733 | 9/1985 | Germany . |
| 228836 | 10/1985 | Germany . |
| 50-109843 | 8/1975 | Japan . |
| 53-044898 | 12/1978 | Japan . |
| 56-069377 | 6/1981 | Japan . |
| 58-026434 | 6/1983 | Japan . |
| 2137185 | 2/1984 | United Kingdom . |

OTHER PUBLICATIONS

Chemical Abstracts, vol. 97, p. 90, para. 129206d, 1982.
Chemical Abstracts, vol. 97, para. 15506w, 1986.
Chemical Abstracts, vol. 107, p. 15519, para. 15509z, 1986.
Chemical Abstracts, vol. 100, para. 51733g, 1983.
Chemical Abstracts, vol. 74(b), para. 2759k, 1970.
Chemical Abstracts, vol. 91, p. 446, para. 46271w, 1979.
Chemical Abstracts, vol. 105, para. 62332e, 1985.
Chemical Abstracts, vol. 68, para. 14031b, 1967.

*Primary Examiner*—Kriellion Sanders
*Attorney, Agent, or Firm*—Pennie & Edmonds LLP

[57] ABSTRACT

Novel corrosion inhibiting compositions and methods for applying these compositions to metal surfaces so as to inhibit rusting and formation of blisters wherein the compositions comprise at least one aminocarboxylate salt, a pigment, a binder and a solvent.

18 Claims, No Drawings

AMINOCARBOXYLATE SALTS AS CORROSION INHIBITORS IN COATING APPLICATIONS

This is a continuation of application Ser. No. 07/821,240, filed Jan. 10, 1992, now abandoned, which is a continuation of application Ser. No. 07/418,294 filed Oct. 6, 1989 now abandoned.

BACKGROUND OF THE INVENTION

Corrosion is an extremely broad problem and encompasses, but is not limited to the following categories of industrial materials: structural and manufacturing applications, aqueous system applications, coatings and films, lubricant, fuel and hydraulic fluid additives, natural gas and oil industry applications and metal treating baths.

In particular, the problem of corrosion of metal surfaces in contact with various corrosive environments such as gas, electrolyte solutions and solvents is long well known. It is quite an expensive proposition. According to a 1978 National Bureau of Standards Special Publication, corrosion of metal surfaces cost the economy in excess of $70 billion a year, about 4% of the gross national product.

Currently, there are various types of products available to protect metallic surfaces. Popular systems include inorganic pigments (inhibitive and sacrificial) and barrier coatings. The inorganic pigment products enjoy a lion's share of the market. In the inhibitor pigment market, 75% consists of chromate pigments, which are considered to be toxic and the effluent waste problems are of concern.

Currently, the pigments which have been developed to replace chromate, barium and lead based pigments themselves lack the efficacy of corrosion prevention that the toxic pigments possess. Therefore, the need exists for a corrosion inhibitor which is relatively non-toxic, has a high degree of efficacy and is cost competitive. Moreover, such corrosion inhibitor should have limited water solubility, thereby extending the protection of metal surfaces for a longer period of time.

Accordingly, an object of this invention is to provide compositions which are low toxicity inhibitors capable of replacing chromate and other toxic pigments.

Another object of this invention is to provide compositions which can be applied to surfaces to inhibit corrosion and pitting of the metal.

Another object of this invention is to provide corrosion inhibiting compositions which are insoluble in water, thereby increasing the protection period of the metal surfaces.

Another object of this invention is to provide corrosion inhibiting compositions which are liquid in form, thus easy to handle and incorporate into paint formulations. The distribution of such composition in the paint system is also greatly enhanced.

Another object of this invention is to provide corrosion inhibiting compositions which consist of both anodic passifier groups, such as zinc and calcium, and cathodic passifier groups, such as substituted amines.

Another object of this invention is to provide corrosion inhibiting compositions which are substantially more effective than the currently used inhibitive pigments.

SUMMARY OF THE INVENTION

The present invention accordingly provides for a novel and improved composition for inhibiting corrosion in coating applications which is an excellent alternative to currently available products comprising at least one aminocarboxylate compound as a corrosion inhibitor having a basic structure of:

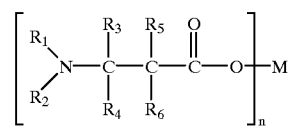

wherein M is a metal ion, preferably an alkali earth or transition metal, and most preferably $Zn^{+2}$, $Sn^{+n}$ or $Ca^{+2}$; $R_1$ and $R_2$ independent of each other, is, H, $^-C_1$–$C_{20}$ alkyl, aryl, akylene and where $R_1$ and $R_2$ may also combine to form a fused cycloalkyl group, cycloalkenyl group or a heterocyclic group containing O, N or S as part of the ring; $R_3$–$R_6$, independent of each other, are hydrogen, lower alkyl or lower substituted alkyl, phenyl, substituted phenyl, cycloalkyl having 5 to 6 carbon atoms, benzyl, or substituted benzyl and the like, and n=2–4.

The preferred compounds are: zinc 3-morpholino propionate, zinc 3-(4 methylpiperazino)propionate, zinc 3-(piperdino)propionate, zinc 3-(diisobutylamino) propionate, zinc 3-(dipropylamino)propionate, zinc 3-(diethylamino)propionate, zinc 3-(di-n-propylamino)-propionate, zinc 3-dimethylamino propionate, and zinc 3-dicyclohexylamino propionate.

These aminocarboxylate compounds can be used either singly or as a combination of two or more compounds according to need. The amounts of aminocarboxylate range from about 0.5 to about 7.5 weight percent of the total composition.

The composition for inhibiting corrosion in coating applications further comprises an effective amount of pigment; an effective amount of binder; and an effective amount of solvent. Preferably, the amount of pigment is from about 20 to about 30 weight percent, the amount of binder is from about 30 to about 40 weight percent, and the amount of solvent is from about 30 to about 70 weight percent. The pigment can be iron oxide, titanium dioxide, magnesium silicate, clays, zinc oxide, calcium silicate, calcium carbonate and the like.

For water-based compositions such as latex paints, the binder is a latex polymer-water emulsion or dispersion in which the polymer can be an acrylic, vinyl acrylic, or polyvinyl alcohol polymer. The solvent is water soluble and can be principally water itself.

For oil-based compositions or paints employing fatty acids or fatty oils, polybasic acids and polyhydric alcohols, such as alkyd paints, the binder can be an alkyd resin containing 50 to 70% solids. An appropriate solvent can be selected from the group consisting of mineral spirits, naphtha, xylene, toluene, butanol and 2-butoxyethanol and the like. The oil-based compositions can further comprise additives such as an effective amount of metal drier and an effective amount of anti-skinning agent. Preferably, the amount of metal drier is from about 1 to about 3 weight percent and the amount of anti-skinning agent is from about 0.1 to about 0.2 weight percent.

The corrosion inhibitor of the present invention can be applied beyond the above-described coating applications to applications such as metal cutting fluids. A metal working fluid consists of three basic types; namely, soluble oil, semi-synthetic and synthetic. Soluble oil forms a stable emulsion in water and consists of 67–69% naphthenic oil, 16–18% emulsifier; 1.5–3% biocide, 2–4% corrosion inhibitor, 4–6% coupling solvent and 4–6% other additives. A semi-synthetic oil forms a translucent solution and consists of 52–58% water, 4–6% emulsifier, 1.5–3% biocide, 5–7% corrosion inhibitor, 14–16% naphthenic oil, 14–16% surfactant and 1–2% coupling solvent. A synthetic oil is completely water soluble and consists of 69–71% water, 9–11% corrosion inhibitor, 1.5–3% biocide, 4–6% lubricant, 4–6% triethanol amine and 7–9% other additives. The amino carboxylate salts of the instant invention can be incorporated as the corrosion inhibitor in the above types of metal working fluids.

Thus, the aminocarboxylate compositions of this invention are effective in the control of corrosion in general industrial applications as well as specifically in coating applications such as on bridges, structures and the like and metal cutting applications as described above.

DESCRIPTION OF THE PREFERRED EMBODIMENTS

Preparation of the Products of the Invention

The aminocarboxylates of this invention can be prepared in two steps. The first step involves the reaction of an acrylic acid or substituted acrylic acid with a metal oxide such as zinc oxide or calcium oxide in an aromatic hydrocarbon solvent such as benzene, toluene, etc. The water of reaction is azeotroped off and reaction completion is signalled by the end of water evolution. The secondary amine is then added to the reaction mixture at 25–30° C. over a period of a half hour to an hour, the temperature of the reaction mixture is maintained below 65–70° C. by applying a cooling bath if necessary. After addition of the amine is completed, the temperature of the reaction mixture is maintained at 65–70° C. for an additional hour. The reaction mixture is then cooled to room temperature and the benzene distilled off under vacuum, up to a pot temperature of 100° C. Upon completion of benzene removal, the reaction mixture is cooled to 45–50° C. and a suitable solvent is added to dissolve the highly viscous product, producing a solution containing 30–80% active material.

The reaction could be carried out in a variety of solvents, such as cyclohexane, toluene, xylene and the like. The only caution that should be exercised is that the temperature of the reaction mixture should not exceed 85° C. At higher temperatures, depending on the polarity of the solvent, polymerization of acrylic acid itself would commence and, depending on the duration of the reaction time, the final product would contain substantial amounts of acrylic acid polymers. Polymerization of the acrylic acid is indicated by a haze or precipitation after the required amount of water has been azeotroped off. Addition of hydroquinonemonomethyl ether (HQMME), hydroquinone, etc., aids in suppressing this side reaction. Similar precautions should be taken during the addition of the secondary amine, otherwise zinc acrylate has a tendency to polymerize at higher temperature.

CORROSION INHIBITION PERFORMANCE OF THE PRODUCT OF THE INVENTION

The corrosion inhibition performance of the amino carboxylates was determined by measuring the extent of the corrosion on steel panels coated with a red iron oxide primer. The method used for this evaluation was ASTM B117-73, known in the coatings industry as the salt spray (fog) test. The steel panels are cleaned to remove any dirt or oil film; then they are coated with a red iron oxide primer which contains the candidate corrosion inhibitor compound. The finished steel panels are air dried for the prescribed period and then placed in the salt spray cabinet along with positive and negative controls. The steel panels are treated with a 5% salt spray in the spray cabinet for 400 hours. After the test period is over, the specimens are gently washed with clean running water at temperatures lower than 38° C. (100° F.) to remove salt deposits from their surface, and then immediately dried. Drying is accomplished by a stream of clean, compressed air. The dry specimens are rated for corrosion and blistering (ASTM D714-56).

The red iron oxide primer formulation has been listed in Table I.

TABLE I

| RAW MATERIALS | POUNDS |
| --- | --- |
| Alkyd Resin - 50% in Mineral Spirits Medium Oil Soybean/Linseed (Beckosol 11-070) | 80.0 |
| Soya Lecithin | 2.0 |
| Mixed for several minutes | |
| Red Iron Oxide (Pfizer R-1599) | 125.0 |
| Talc (Nytal 300) | 90. 0 |
| Mineral Spirits | 5.0 |
| Grind for 35 minutes | |
| Mineral spirits | 40.0 |
| Alkyd Resin - 50% in Mineral Spirits | 70.0 |
| 6% Cobalt Drier | 1.4 |
| 6% Manganese Drier | 0.9 |
| 6% Zirconium Drier | 2.3 |
| Anti-skinning agent | 1.0 |

EXAMPLE 1

In this example, zinc 3-morpholino propionate was prepared in a two stage process. The first step involved the addition of 10.3 grams zinc oxide to a reaction mixture containing 31.7 grams acrylic acid and 100 cc benzene. The reaction mixture was heated to reflux and approximately 3.6 cc of water was azeotroped off. Then the reaction mixture was cooled to room temperature and 44 g morpholine was added dropwise. Morpholine addition was exothermic and the temperature of the reaction mixture was controlled below 85° C. by applying a cooling bath. After the completion of morpholine addition, the reaction mixture was maintained at 60–65° C. for ½ hour. After the reaction mixture cooled to room temperature and benzene was distilled off, 94.6 grams of a viscous product was obtained.

| | Calc | Found |
| --- | --- | --- |
| % Zinc | 13.8 | 13.65 |

EXAMPLE 2

In this example, zinc 3-(4-methylpiperazino)propionate was prepared in a two step, single pot reaction. First, 34.6 grams acrylic acid and 100 cc benzene were charged in a 250 ml flask. Zinc oxide (16.3 grams) was added to the reaction mixture while agitating. The reaction mixture was heated to reflux and approximately 3.6 cc of water was azeotroped off. The reaction mixture was cooled to room temperature and 48 grams 4-methylpiperazine was added dropwise. An exothermic reaction ensued, which was controlled by a cooling bath to maintain reaction temperature to 60–66° C. After completion of 4-methylpiperazine addition, the reaction mixture was maintained at 60–65° C. for ½ hour. The reaction mixture was cooled to room temperature and benzene distilled off leaving behind 98.3 grams of viscous liquid. Diethylene glycol, 98.3 grams, was added to the reaction mixture to produce approximately 50% solution of the corrosion inhibitor.

|        | Calc | Found |
|--------|------|-------|
| % Zinc | 6.77 | 6.69  |

In this example, zinc 3-(piperidino)propionate was prepared in a two step, single pot reaction. First, 34.6 grams acrylic acid and 100 cc benzene were charged in a 250 ml flask. 16.3 grams of zinc oxide was added to the reaction mixture while agitating. The reaction mixture was heated to reflux and approximately 3.6 cc of water was azeotroped off. The reaction mixture was cooled to room temperature and 40.9 grams piperdine was added dropwise. An exothermic reaction ensued, which was controlled by a cooling bath to maintain reaction temperature to 60–65° C. After completion of piperidine addition, the reaction mixture was maintained at 60–65° C. for ½ hour. The reaction mixture was cooled to room temperature and benzene distilled off leaving behind 88.5 grams of an off-white viscous oil. Diethylene glycol, 88.5 grams, was added to the reaction mixture to produce approximately 50% solution of the corrosion inhibitor.

|        | Calc | Found |
|--------|------|-------|
| % Zinc | 7.39 | 7.30  |

EXAMPLE 4

In this example, zinc 3-(diisobutylamino)propionate was prepared in a two step, single pot reaction. First, 34.6 grams acrylic acid and 100 cc benzene were charged in a 250 ml flask. Then, 16.3 grams of zinc oxide was added to the reaction mixture while agitating. The reaction mixture was heated to reflux and approximately 3.6 cc of water was azeotroped off. The reaction mixture was cooled to room temperature and 62 grams diisobutylamine was added dropwise. An exothermic reaction ensued, which was controlled by a cooling bath to maintain reaction temperature to 60–65° C. After completion of diisobutylamine addition, the reaction mixture was maintained at 60–65° C. for ½ hour. The reaction mixture was cooled to room temperature and benzene distilled off leaving behind 65.9 grams of an off-white viscous oil. Diethylene glycol, 65.9 grams, was added to the reaction mixture to produce approximately 50% solution of the corrosion inhibitor.

|        | Calc | Found |
|--------|------|-------|
| % Zinc | 9.93 | 9.73  |

EXAMPLE 5

In this example, zinc 3-(dipropylamino)propionate was prepared in a two step, single pot reaction. First, 34.6 grams acrylic acid and 100 cc benzene were charged in a 250 ml flask. Then, 16.3 grams of zinc oxide was added to the reaction mixture while agitating. The reaction mixture was heated to reflux and approximately 3.6 cc of water was azeotroped off. The reaction mixture was cooled to room temperature and 48.6 grams dipropylamine was added dropwise. An exothermic reaction ensued, which was controlled by a cooling bath to maintain reaction temperature to 60–65° C. After completion of dipropylamine addition, the reaction mixture was maintained at 60° C. for ½ hour. The reaction mixture was cooled to room temperature and benzene distilled off leaving behind 79.7 grams of an off-white viscous oil. Diethylene glycol, 79.7 grams, was added to the reaction mixture to produce approximately 50% solution of the corrosion inhibitor.

|        | Calc | Found |
|--------|------|-------|
| % Zinc | 8.21 | 8.09  |

EXAMPLE 6

In this example, zinc 3-(diethylamino)propionate was prepared in a two step, single pot reaction. First, 34.6 grams acrylic acid and 100 cc benzene were charged in a 250 ml flask. Then, 16.3 grams of zinc oxide was added to the reaction mixture while agitating. The reaction mixture was heated to reflux and approximately 3.6 cc of water was azeotroped off. The reaction mixture was cooled to room temperature and 87 grams dicyclohexylamine was added dropwise. An exothermic reaction ensued, which was controlled by a cooling bath to maintain reaction temperature to 60–65° C. After completion of dipropylamine addition, the reaction mixture was maintained at 60–65° C. for ½ hour. The reaction mixture was cooled to room temperature and benzene distilled off leaving behind 134.6 grams of an off-white viscous oil. Diethylene glycol, 134.6 grams, was added to the reaction mixture to produce approximately 50% solution of the corrosion inhibitor.

|        | Calc | Found |
|--------|------|-------|
| % Zinc | 8.99 | 8.88  |

EXAMPLE 7

The compositions of the present invention were tested as to their ability to inhibit corrosion on a stainless steel surface. The method uses a salt spray cabinet constructed so as to maintain both the temperature and salt fog at optimal conditions for promoting corrosion of steel panels. A reservoir containing 5% salt solution delivers the solution through a spray nozzle to produce a uniform fog throughout the chamber. By replacing the amount of salt solution used up, the test can be carried out over a lengthy period of time.

The panels are made of cold rolled steel approximately 3"×6" and 0.024 to 0.038 inch thickness, having a hardness (Rockwell "B") of 55 to 65 and roughness 30–65 $\mu$in (ASTM Specifications A109 and A366). The panels are cleaned and prepared for coating in accordance with applicable procedure of method D609. The panels are then coated with red iron oxide alkyd primer containing the corrosion inhibitor at the desired concentrations. Panels coated with the primer containing no corrosion inhibitor are used as the negative control. The coated panels are placed in the salt spray chamber between 15 and 30 degrees from the vertical and preferably parallel to the principal direction of horizontal flow of fog through the chamber, based upon the dominant surface being tested. Replicate panels are placed randomly in the chamber. The panels are examined and rated every 100 hours up to 1000 hours. The actual time period is determined by the failure of the negative control and pass of the positive control. The panels are rated for corrosion and blistering. Corrosion is rated from 10 (no corrosion) to 0 (maximum corrosion) and blistering is rated in terms of size and density. The size is rated from 10 (no blistering) to 0 (big blisters) and density, dense (D) to few (F). This method is described in detail in ASTM- B117-73.

TABLE II

CORROSION PERFORMANCE DATA AT INDICATED TIME INTERVALS

| INHIBITOR | CONCEN-TRATION %[1] | HOURS | | | |
|---|---|---|---|---|---|
| | | 100 | 200 | 300 | 400 |
| Control - No inhibitor | — | R8 B5D | R3 B5D | R1 B5D | R0 B5D |
| Zinc Chromate (Positive Control) | 7.5 | R10 B10F | R10 B10F | R10 B10F | R10 B10F |
| | 5.0 | R9 B10F | R9 B10F | R9 B10F | R9 B10F |
| | 2.5 | R8 B9F | R8 B9F | R8 B9M | R8 B9M |
| Busan 11M1 (Positive Control) | 7.5 | R6 B10D | R1 B5D | R0 B5D | R0 B4D |
| | 5.0 | R1 B8M | R1 B3D | R1 B3D | R1 B3D |
| Example 1 | 5.0 | R10 B10F | R10 B9F | R9 B9F | R9 B9F |
| | 2.5 | R6 B8F | R5 B7M | R5 B6MD | R2 B5D |
| Example 2 | 5.0 | R10 B10F | R9 B10F | R9 B9M | R9 B9M |
| | 2.5 | R10 B10F | R10 B10F | R9 B10F | R9 B10F |
| Example 3 | 5.0 | R10 B10F | R9 B10F | R9 B10M | R9 B10D |
| | 2.5 | R8 B8MD | R8 B7MD | R8 B6MD | R7 B6D |
| Example 4 | 7.5 | R8 B8F | R8 B5F | R8 B5F | R8 B5F |
| | 2.5 | R7 B7M | R7 B7M | R7 B6MD | R0 — |
| Example 5 | 5.0 | R10 B10F | R10 B10F | R10 B10F | R10 B10F |
| | 2.5 | R9 B7MD | R9 B7MD | R9 B7MD | R8 B7MD |
| Example 6 | 7.5 | R7 B7M | R7 B6MD | R7 B5MD | R7 B5MD |
| | 5.0 | R8 B7F | R7 B7F | R7 B7MD | R0 B7MD |

LEGEND:
R - Rating for rusting
B - Rating for blisters
D - Dense
M - Medium
F - Few
1 - Concentration is based on total system The composition and method for inhibiting corrosion in coating applications can be varied in a number of ways without departing from the scope and spirit of the claims. The present description is intended to illustrate the principles and mode of operation of the invention and not to rigidly define the composition or method.

I claim:

1. An article having a metal surface and a coating composition thereupon, said coating composition comprising (a) from about 0.5 to about 7.5 weight percent of a corrosion inhibitor comprising at least one aminocarboxylate salt of the formula:

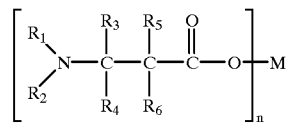

wherein M is a metal ion of zinc, tin or calcium and n=2 to 4 $R_1$ and $R_2$, independent of each other, are each H, $C_1$–$C_{20}$ alkyl, aryl, or alkylene and where $R_1$ and $R_2$ may also combine to form a fused cycloalkyl group or a cycloalkenyl group; $R_3$, $R_4$, $R_5$ and $R_6$, independently of each other, are each hydrogen, lower alkyl or substituted lower alkyl, phenyl, cycloalkyl having 5 to 6 carbon atoms, or benzyl;

(b) a pigment;

(c) a binder of a latex polymer emulsion comprising a compound selected from the group consisting of acrylic, vinyl acrylic, and polyvinyl alcohol polymers; and (d) a solvent comprising a water soluble compound or water.

2. The article according to claim 1, wherein each aminocarboxylate salt is selected from the group consisting of zinc 3-morpholino propionate, zinc 3-(4 methylpiperazino) propionate, zinc 3-(piperdino)propionate, zinc 3-(diisobutylamino)propionate, zinc 3-(dipropylamino) propionate, zinc 3-(diethylamino)propionate, zinc 3-(di-n-propylamino)-propionate, zinc 3-dimethylamino propionate, zinc 3-dicyclohexylamino propionate, and mixtures thereof.

3. An article having a metal surface and a coating composition thereupon, said coating composition comprising (a) from about 0.5 to about 7.5 weight percent of a corrosion inhibitor comprising at least one aminocarboxylate salt of the formula:

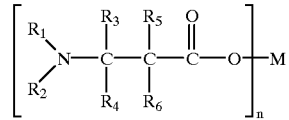

wherein M is a metal ion of zinc, tin or calcium and n=2 to 4; $R_1$ and $R_2$, independent of each other, are each H, $C_1$–$C_{20}$ alkyl, aryl, or alkylene and where $R_1$ and $R_2$ may also combine to form a fused cycloalkyl group or a cycloalkenyl group; $R_3$, $R_4$, $R_5$ and $R_6$, independently of each other, are each hydrogen, lower alkyl or substituted lower alkyl, phenyl, cycloalkyl having 5 to 6 carbon atoms, or benzyl;

(b) a pigment;

(c) a binder of an alkyd resin containing 50 to 70% solids; and (d) a solvent selected from the group consisting of mineral spirits, xylene, toluene, naphtha, butanol, 2-butoxyethanol, and mixtures thereof.

4. The article according to claim 3 wherein each aminocarboxylate salt is selected from the group consisting of zinc 3-morpholino propionate, zinc 3-(4 methylpiperazino) propionate, zinc 3-(piperdino)propionate, zinc 3-(diisobutylamino)propionate, zinc 3-(dipropylamino) propionate, zinc 3-(diethylamino)propionate, zinc 3-(di-n-propylamino)-propionate, zinc 3-dimethylamino propionate, zinc 3-dicyclohexylamino propionate, and mixtures thereof.

5. The article according to claim 3 further comprising a metal drier.

6. The article according to claim 3 further comprising an anti-skinning agent.

7. The article according to claim 4 further comprising a metal drier.

8. The article according to claim 4 further comprising an anti-skinning agent.

9. An article having a metal surface and a coating composition thereupon, said coating composition comprising:
   (a) from about 0.5 to about 7.5 weight percent of a corrosion inhibitor comprising at least one aminocarboxylate salt of the formula:

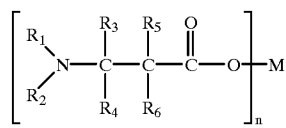

wherein M is $Zn^{+2}$, $Sn^{+n}$ or $Ca^{+2}$ and n=2 to 4; $R_1$ and $R_2$ independent of each other, are each H, $C_1$–$C_{20}$ alkyl, aryl, or alkylene, and where $R_1$ and $R_2$ may also combine to form a fused cycloalkyl group or a cycloalkenyl group; $R_3$, $R_4$, $R_5$ and $R_6$, independently of each other, are each hydrogen, lower alkyl or substituted lower alkyl, phenyl, cycloalkyl having 5 to 6 carbon atoms, or benzyl;
   (b) a pigment;
   (c) an alkyd resin which contains 50 to 70% solids;
   (d) a solvent which is selected from the group consisting of 2-butoxyethanol, toluene, mineral spirits, naphtha, xylene, butanol, and mixtures thereof;
   (e) a metal drier; and
   (f) an anti-skinning agent.

10. A method of inhibiting corrosion of a metal surface which comprises applying to the metal surface a coating composition comprising:
   (a) from about 0.5 to about 7.5 weight percent of a corrosion inhibitor comprising at least one aminocarboxylate salt of the formula:

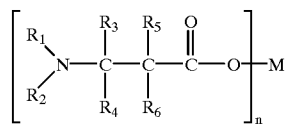

wherein M is a metal ion of zinc, tin or calcium and n=2 to 4; $R_1$ and $R_2$, independent of each other, are each H, $C_1$–$C_{20}$ alkyl, aryl, or alkylene and where $R_1$ and $R_2$ may also combine to form a fused cycloalkyl group or a cycloalkenyl group; $R_3$, $R_4$, $R_5$ and $R_6$, independently of each other, are each hydrogen, lower alkyl or substituted lower alkyl, phenyl, cycloalkyl having 5 to 6 carbon atoms, or benzyl;
   (b) a pigment;
   (c) a binder; and
   (d) a solvent, and further comprising the step of selecting as the binder a latex polymeric emulsion comprising a compound selected from the group consisting of acrylic, vinyl acrylic, and polyvinyl alcohol polymers; and selecting as the solvent one which is water soluble or comprises water prior to applying the composition to the metal surface.

11. The method according to claim 10 further comprising the step of selecting the aminocarboxylate salts from the group consisting of zinc 3-morpholino propionate, zinc 3-(4 methylpiperazino)propionate, zinc 3-(piperdino)propionate, zinc 3-(diisobutylamino)propionate, zinc 3-(dipropylamino) propionate, zinc 3-(diethylamino)propionate, zinc 3-(di-n-propylamino)-propionate, zinc 3-dimethylamino propionate, zinc 3-dicyclohexylamino propionate, and mixtures thereof, prior to applying the composition to the metal surface.

12. A method of inhibiting corrosion of a metal surface which comprises applying to the metal surface a coating composition comprising:
   (a) from about 0.5 to about 7.5 weight percent of a corrosion inhibitor comprising at least one aminocarboxylate salt of the formula:

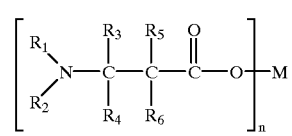

wherein M is a metal ion of zinc, tin or calcium and n=2 to 4; $R_1$ and $R_2$, independent of each other, are each H, $C_1$–$C_{20}$ alkyl, aryl, or alkylene and where $R_1$ and $R_2$ may also combine to form a fused cycloalkyl group or a cycloalkenyl group; $R_3$, $R_4$, $R_5$ and $R_6$, independently of each other, are each hydrogen, lower alkyl or substituted lower alkyl, phenyl, cycloalkyl having 5 to 6 carbon atoms, or benzyl;
   (b) a pigment;
   (c) a binder; and
   (d) a solvent, and further comprising the step of selecting as the binder an alkyd resin containing 50 to 70% solids; and selecting the solvent from the group consisting of mineral spirits, xylene, toluene, naphtha, butanol, 2-butoxyethanol, and mixtures thereof, prior to applying the composition to the metal surface.

13. The method according to claim 12 further comprising the step of selecting the aminocarboxylate salts from the group consisting of zinc 3-morpholino propionate, zinc 3-(4 methylpiperazino)propionate, zinc 3-(piperdino)propionate, zinc 3-(diisobutylamino)propionate, zinc 3-(dipropylamino) propionate, zinc 3-(diethylamino)propionate, zinc 3-(di-n-propylamino)-propionate, zinc 3-dimethylamino propionate, zinc 3-dicyclohexylamino propionate, and mixtures thereof, prior to applying to the metal surface.

14. A method according to claim 12 further comprising the step of selecting an effective amount of metal drier.

15. A method according to claim 12 further comprising the step of selecting an effective amount of anti-skinning agent.

16. A method according to claim 13 further comprising the step of selecting an effective amount of metal drier.

17. A method according to claim 13 further comprising the step of selelcting an effective amount of anti-skinning agent.

18. A method of inhibiting corrosion of a metal surface which comprises applying to the metal surface a coating composition comprising:
   (a) from about 0.5 to about 7.5 weight percent of a corrosion inhibitor comprising at least one aminocarboxylate salt of the formula:

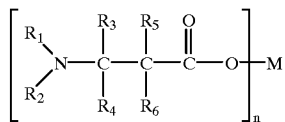

wherein M is $Zn^{+2}$, $Sn^{+n}$ or $Ca^{+2}$ and n=2 to 4; $R_1$ and $R_2$, independent of each other, are each H, $C_1$–$C_{20}$ alkyl, aryl, or alkylene, and where $R_1$ and $R_2$ may also combine to form a fused cycloalkyl group or a cycloalkenyl group; $R_3$, $R_4$, $R_5$ and $R_6$, independently of each other, are each hydrogen, lower alkyl or substituted lower alkyl, phenyl, cycloalkyl having 5 to 6 carbon atoms, or benzyl;

(b) a pigment;

(c) an alkyd resin which contains 50 to 70% solids;

(d) a solvent which is selected from the group consisting of mineral spirits, xylene, toluene, naphtha, xylene, butanol, 2-butoxyethanol, and mixtures thereof;

(e) a metal drier; and (f) an anti-skinning agent.

* * * * *

UNITED STATES PATENT AND TRADEMARK OFFICE
CERTIFICATE OF CORRECTION

PATENT NO. : 6,127,467
DATED : October 3, 2000
INVENTOR(S) : Kamlesh D. GAGLANI

It is certified that error appears in the above-identified patent and that said Letters Patent is hereby corrected as shown below:

Col. 8, line 12, replace "$4R_1$" with --4; $R_1$--.

Signed and Sealed this

Twenty-fourth Day of April, 2001

Attest:

NICHOLAS P. GODICI

*Attesting Officer*  *Acting Director of the United States Patent and Trademark Office*